June 30, 1953 C. A. SHERMAN 2,643,689

VENEER PATCH ROUTING AND PATCH HOLDING DURING ROUTING MECHANISM

Filed Dec. 27, 1949 5 Sheets-Sheet 1

INVENTOR.
Charles A. Sherman
BY
Arnold and Mathews
ATTORNEYS

INVENTOR.
Charles A. Sherman
BY
Arnold and Matthews
ATTORNEYS

INVENTOR.
Charles A. Sherman
BY
Arnold and Matthews
ATTORNEYS

INVENTOR.
Charles A. Sherman
BY
Arnold and Mathews
ATTORNEYS

INVENTOR.
Charles A. Sherman
BY
Arnold and Mathis
ATTORNEYS

Patented June 30, 1953

2,643,689

UNITED STATES PATENT OFFICE 2,643,689

VENEER PATCH ROUTING AND PATCH HOLDING DURING ROUTING MECHANISM

Charles A. Sherman, Tacoma, Wash.

Application December 27, 1949, Serial No. 135,197

13 Claims. (Cl. 144—2)

This invention relates to a patch routing machine for making patches or pieces of predetermined shape and means for holding and supporting the patch section and controlling its release after being formed. More particularly, the present invention is an improvement on the machine disclosed in my prior patent application Serial No. 53,248 filed October 7, 1948. The machine herein disclosed is designed for making wood veneer patches of oval shape to be used in patching plywood, but it will be understood that this machine is adapted for making patches or pieces of various other shapes and for other uses.

Heretofore, veneer patches of my experience have had the surface of their edge portions possessed of small projections, depressions and irregularities which prevent the patch from accurately and precisely fitting into the veneer opening to be repaired. To provide a veneer patch characterized in having its edge portion of smooth and even cut surface free of projections of material, depressions and irregularities is the object of this invention. In general and briefly and therefore incompletely stated, I have discovered that by holding and supporting the patch section to be cut from the patch veneer stock during and throughout the application of the routing tool in cutting or forming the patch and controlling the releasing or removal of the cut out patch, that a patch results characterized by having its edge surface smooth and free of above named objections. The improvement features of the invention herein set forth in providing such an improved patch appear particularly in Figs. 1, 5, 5A, 5B, 6 and 20.

In the manufacture of plywood, after several sheets of veneer have been glued together to form the plywood, it is often desirable to correct surface imperfections by removing defective spots, such as pitch pockets, knots and the like, from the surface plies and gluing in place thereof patches of veneer. Usually these patches are of oval shape. The defective spots are commonly removed from the surface plies of the plywood by routing because this can be done quickly and easily and without digging into the inner or core plies to which the surface plies are glued. In routing a defective spot out of a surface ply so as to leave an oblong hole, it is necessary that this hole shall have rounded rather than pointed ends due to the fact that the routing tool is essentially a cylindrical tool. For this reason it is necessary to provide oval patches, with rounded ends, to properly fit the routed out holes in the surface plies, and it is desirable to form these patches by routing.

When a single ply veneer is to be patched before it has been made into plywood, this can be done in a satisfactory manner by sawing out defects so as to leave, in the single ply veneer, holes with pointed ends and by sawing out oblong "boat shaped" patches with pointed ends to fit these holes. However, as above pointed out, it is not practical to saw out defects and leave oblong openings with pointed ends in surface plies after the veneer has been made into plywood, but is more practical to rout out these defects thereby leaving oblong or oval shaped openings with rounded ends which must be patched by using patches with rounded ends.

In the machine disclosed in my prior application hereinbefore identified means are provided for firmly holding the strip of stock from which patches are being made while the patches are being cut but no means are provided for holding the patch itself while it is being cut or routed out. It is an object of this invention to provide means for holding the patch itself while it is being cut thereby making it possible to provide a patch with a smoother and more even edge and one which is free from edge defects and controls the release and discharge of the patch.

It is an object of this invention to provide an automatic machine which will make oval shaped patches with rounded ends, inexpensively and accurately, and at a high rate of speed.

Another object of this invention is to provide a patch cutting machine in which all of the operations are carefully and accurately timed and waste of material is reduced to a minimum.

A further object of this invention is to provide a mechanism to cause the follower roller to follow precisely the cam.

A further object of my invention is the providing of a variable angular feed control mechanism in a limited space.

A further object of this invention is to provide an electrically controlled hydraulic positioning mechanism.

One of the problems in cutting a veneer patch is the providing of a smooth cut edge and this in turn requires a rigidity of holding. A further primary object of my invention is the providing of a method and mechanism of holding the material from which the patch is being cut with such rigidity that a smooth cut edge results. Accordingly, in addition to clamping the material, my object is to supplement the holding means by placing the material under tension.

A further primary object of my invention is to eliminate complex mechanism and this is done in part by positioning the means which actuates or causes the routing tool to follow a predetermined path by positioning the said mechanism controlling the cam follower roller immediately beneath the cams and mounting the routing tool on the arm or leg of a U-shaped bracket axially above said follower roller, the said follower roller being mounted on the other arm or leg of said U-shaped member. A further object of such a positioning is to provide for selectively engaging a plurality of cams for controlling the path of the routing tool.

A further primary object of my invention is to provide an electrical circuit which will tie together all the operating constituents of this machine and provide a balanced synchronized movement of all the parts.

A further primary object of my invention is to provide a suitable time interval between the finish cut of one patch and the shifting of the material for the next patch. This is accomplished by permitting the routing tool to idly continue in its path of movement while returning to its initial position for cutting.

A further primary object of my invention is to provide a clutch for variably controlling the material feed mechanism for different sizes of patches.

A further object of my invention is to provide such a clutch as will be precise in its control to avoid wastage of material.

The above mentioned general objects of my invention, together with others inherent in the same, are attained by the mechanism illustrated in the following drawings, the same being preferred exemplary forms of embodiment of my invention, throughout which drawings like reference numerals indicate like parts:

Figures 1, 2, 21:
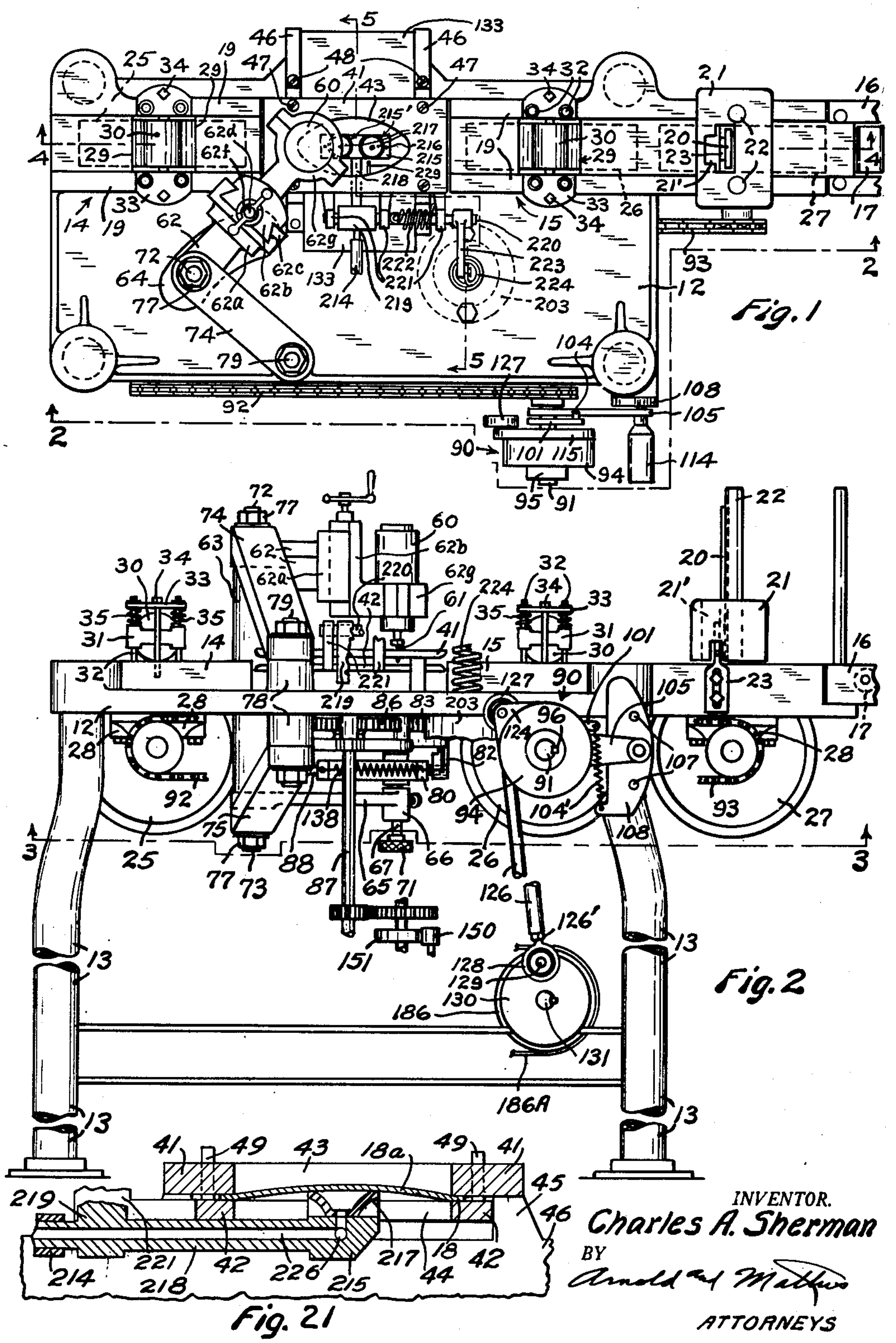
Figure 1 is a top plan view of a plywood patch making machine embodying my invention, part of the supporting means for the material from which the patches are made being broken away at one end of the machine.
Fig. 2 is a side elevation of the same, looking in the direction of broken line 2—2 of Fig. 1, parts being shown in a different position than they are in Fig. 1 and parts being broken away.
Fig. 21 is an enlarged detail view of the holding arm with patch material when under tension.

This patch making machine comprises a table top 12, preferably of rectangular shape, supported on legs 13. This table 12 as herein illustrated is shown in a horizontal position in the drawings, but it will be understood that if desired this entire machine, including the table top 12, may be supported at an angle or incline to facilitate the discharge of patches from the machine by gravity as hereinafter explained. The frame supports or legs on one side of the machine may be shorter than on the opposite side so that the table is disposed in its transverse axis on an incline, thereby permitting the released patch to slide down the incline and free itself from the machine by gravity.

Figure 18:
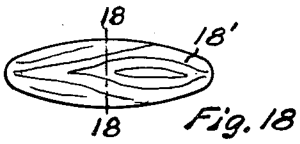
Fig. 18 is a plan view of a patch made by this machine; 18A is a view in cross section on line 18—18 of Fig. 18.
Figure 19:
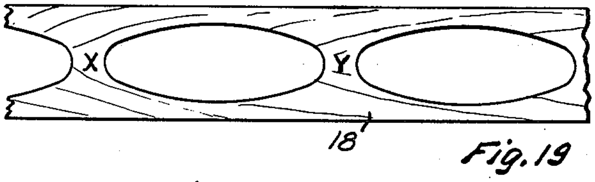
Fig. 19 is a fragmentary plan view of a strip of veneer from which some patches have been cut.
Figure 19A:
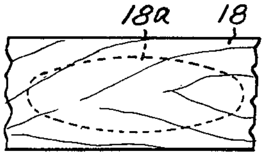
Fig. 19A is a fragmentary view of a strip of patch making material or stock indicating by broken lines the outline of a patch section.
Figure 18A:
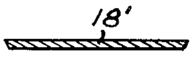

The table top 12 is provided adjacent the side which is shown uppermost in Fig. 1 with two spaced apart aligned longitudinally extending raised portions 14 and 15. The inner ends of these two raised portions 14 and 15 are spaced apart to provide room therebetween for patch making tools as hereinafter described. Preferably, the raised portion 15 shown at the right of Figs. 1, 2 and 4 extends beyond the end of the table and is connected with means, such as frame 16 carrying transfer rolls 17, upon which are supported strips 18 (Figs. 4 and 19) of veneer or other material, from which patches 18' (see Fig. 18) are to be made. Longitudinally extending upwardly protruding spaced apart parallel guide ribs 19 are provided along the respective edges of the raised portions 14 and 15 to serve as guide means for the strips 18 from which patches are to be made.

The strips 18 of veneer stock can be of any desired length. For making patches of the type ordinarily used in patching fir plywood, these strips can be about two and one half inches wide.

Figure 3:
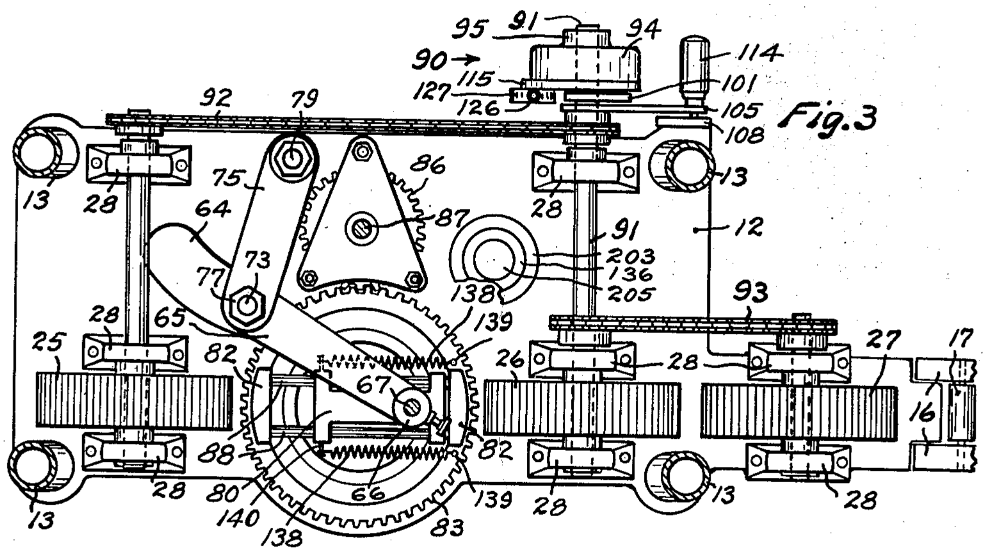
Fig. 3 is a bottom plan view of the same looking in the direction of broken line 3—3 of Fig. 2 and with parts shown in section.
Figure 4:
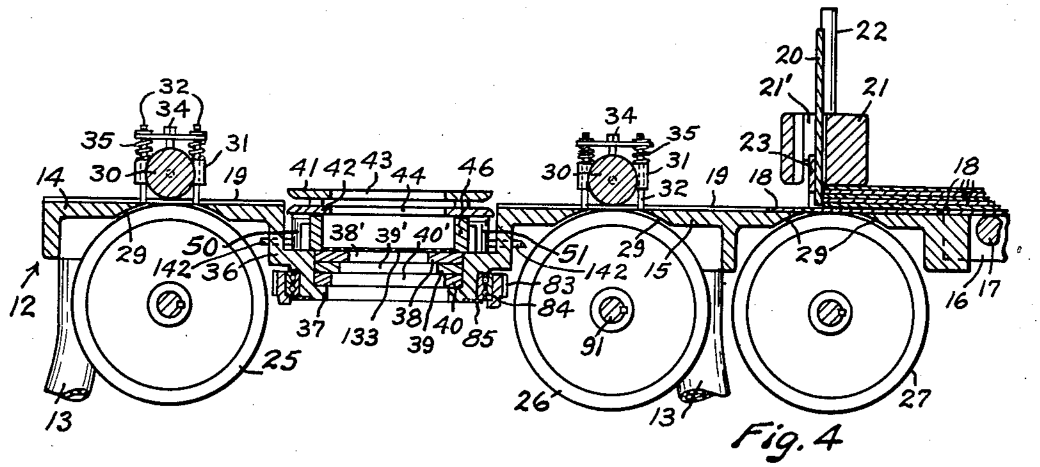
Fig. 4 is a sectional view with parts in elevation taken substantially on broken line 4—4 of Fig. 1, parts being omitted.

The strips of stock 18 from which patches are to be made are stacked in superimposed relation on the rolls 17, Figs. 1, 2 and 4, with their advanced end portions overlapping the table member 15 and with the ends of all of the strips 18, except the lowermost one, resting against an upright stop member 20. The bottom end portion of the stop member 20 is positioned high enough above the frame of the table member 15 so that the lowermost strip 18 will pass thereunder, but all strips above the lowermost strip will be stopped thereby. Preferably the strip engaging face of the upright stop member 20 is positioned a short distance to the left of the axial vertical plane of a feed roll 27, as respects the showing in Fig. 4. This permits the leading end portion of the lowermost strip 18 initially to be positioned on the feed roll 27 in starting the machine and superimposed strips 18 will successively drop down on this feed roll 17 and feed to the left, Fig. 4, as the machine operates. A weight 21 is guided for vertical movement on upright frame posts 22 and rests on the uppermost strip 18 of the pile. This weight 21 is heavy enough to hold the strips 18 against the roll 27 and prevent slippage between the roll 27 and the lowermost strip 18. An opening 21′ in the weight 21 provides clearance for the stop member 20. Preferably the stop member 20 is vertically adjustably supported from a bracket 23 which is secured to the frame. This makes it possible to correctly adjust the stop member 20 vertically to control the feeding of strips 18 of different thickness. These strips will be successively fed to the left through the machine as respects the showing in Figs. 1 to 4 inclusive by means which will now be explained.

The feed roll 27 and other feed rolls such as rolls 25, 26 are rotatively supported beneath the table 12 by bearing means 28. Each feed roll 25, 26 and 27 has a serrated or roughened peripheral surface for engagement with the strips 18 of material to be fed. An opening 29 is provided in the table 12 above each feed roll 25, 26 and 27, see Fig. 4, and each feed roll is positioned with its uppermost peripheral portion substantially flush with the top surface of the portion of the table over which the strips 18 pass.

A hold-down roll 30 is resiliently supported above each of the driven rolls 25 and 26. The supporting means for the hold-down rolls 30 is preferably of the type shown in Figs. 1, 2 and 4, and is in duplicate at each end of each of said rolls 30. This supporting means at each end of each roll 30 preferably comprises a bearing yoke 31 rotatively supporting an end portion of the roll and slidable on two spaced apart upright posts 32 which are fixedly supported by frame 12. A cross yoke 33 is adjustably supported on the upper end portions of each pair of posts 32 and is connected with the frame 12 by adjusting screws 34. Compression springs 35 are provided on the posts 32 between the yokes 31 and 33. The springs 35 yieldingly urge the rolls 30 downwardly and the pressure of these springs can be adjusted by means of the screws 34.

The two driven rolls 25 and 26 are spaced a substantial distance apart and the devices for making the patches are positioned between these two driven rolls, and between the adjacent ends of the raised portions 14 and 15 of the table 12. At this location, the table 12 is provided with a cylindrical cam receptacle 36, Fig. 5, which extends below the plane of the table. The lower edge portion of the cam receptacle 36 has an inwardly extending flange 37. The flange 37 cooperates in supporting a plurality of cam members, such as 38, 39 and 40, which are disposed within the receptacle 36 and fixedly secured thereto as by bolts 24.

The three cams 38, 39 and 40 herein shown have cam tracks or openings 38′, 39′ and 40′ which are of generally oval or elliptical shape but it will be understood that the shape of these cam tracks will be determined by the shape of the patch which it is desired to make. Also, it will be understood that the machine can be provided with one or more cams depending on the number of different size or different shape patches to be cut, provided shapes of cams are non-interfering.

The means for supporting the patch material while the patch is being routed out of the same, comprises two spaced apart parallel horizontal plates 41 and 42 positioned one above another and positioned respectively above and below the path of the strip 18 of material from which the patches are being cut so that the strip 18 can be intermittently advanced between said plates and can be clamped between said plates while the patches are being routed out. The two plates 41 and 42 are respectively provided with centrally disposed openings 43 and 44 for a tool to operate through and for the routed out parts to drop through, as hereinafter described.

Figure 7:
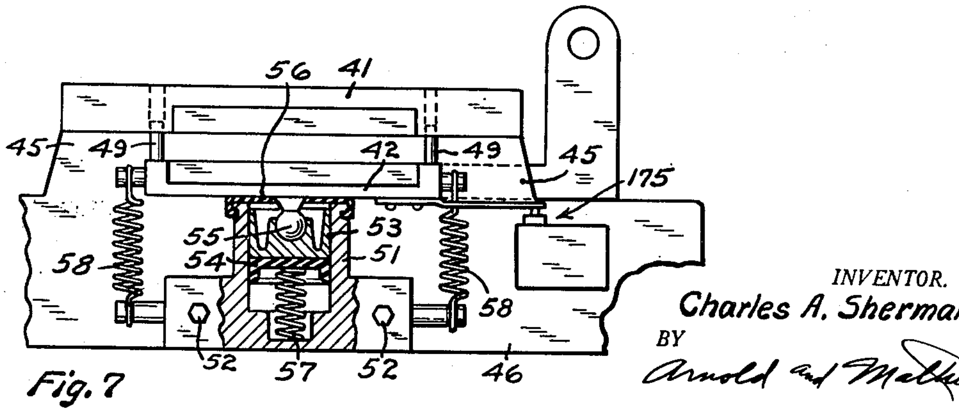
Fig. 7 is a detached fragmentary view partly in section and partly in elevation showing hydraulically operated devices for applying or positioning the patch making material to the router tool and securely clamping the same while a patch is being made.
Figure 5:
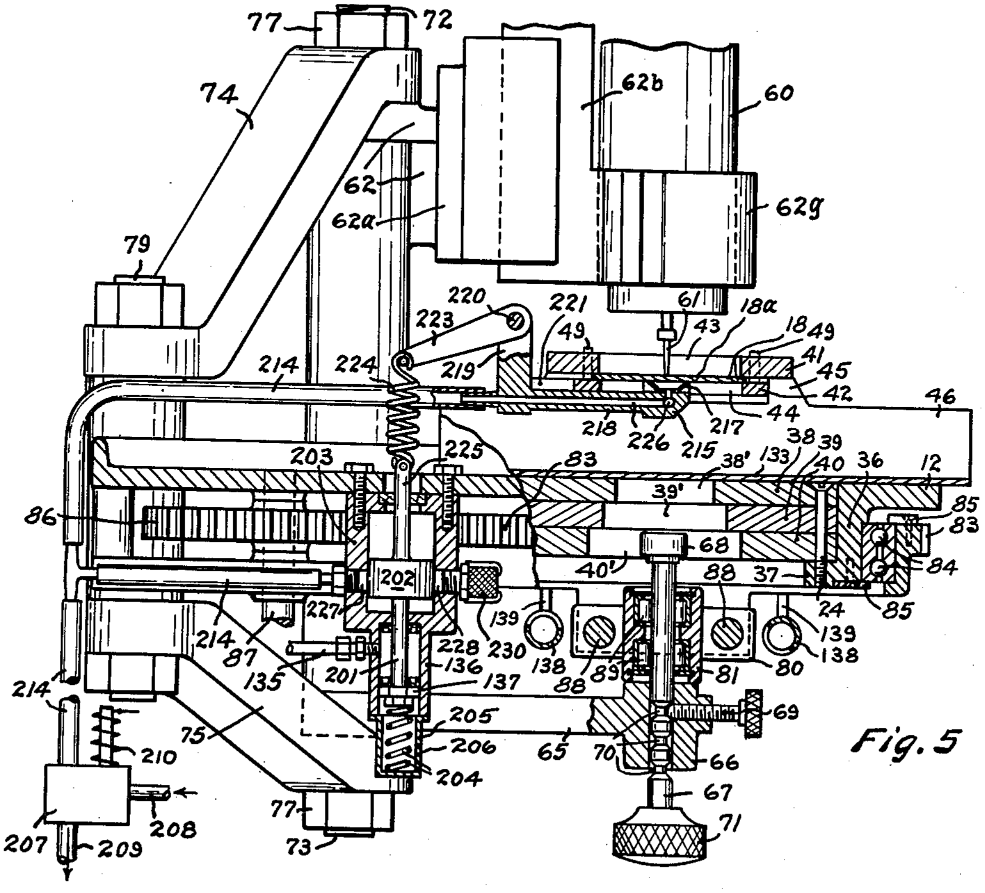
Fig. 5 is a sectional view with parts in elevation taken substantially on broken line 5—5 of Fig. 1, and on a larger scale than Fig. 1.

The uppermost plate 41, see Figs. 5 and 7, is wider than the lowermost plate 42 and said uppermost plate 41 is supported, preferably at four points, on upstanding lugs 45 on two spaced apart parallel support brackets 46. Screws 47 secure the plate 41 to the lugs 45. The brackets 46 rest upon and are secured to the table 12, as by screws 48, and extend crosswise of the path of movement of the strips of patch making material 18.

The lowermost plate 42 is narrower than the upper plate 41 and extends between the lugs 45 of the brackets 46 and is guided for vertical movement relative to the upper plate 41 by dowel pins 49 which are rigidly secured to one of the plates, such as plate 42, and are movable in suitable holes in the other plate 41. Preferably, at least portions of the ends of both plates 41 and 42 between which the material first enters are inclined or beveled as shown in Figs. 2 and 4, to facilitate the entrance of strips 18 of material therebetween and to lessen the danger of choke up at this location. The dowel pins 49 act as guide means of the edges of the strips 18. The strips 18 of material pass between the two plates 41 and 42 and the lower plate 42 is adapted to be lifted to apply the strip 18 of material to a routing tool 61 hereinafter described. The means for lifting the lower plate 42 preferably comprises two hydraulic lifting cylinders 50 and 51, Figs. 4 and 7, of duplicate construction positioned underneath the respective end portions of the plate 42 and connected by conduit means 142 with a hydraulic cylinder 143 as diagrammatically shown in Fig. 20. The hydraulic cylinders 50 and 51, see Fig. 7, can be secured by cap screws 52 to the adjacent support bracket 46. Each hydraulic cylinder 50 and 51, see Fig. 7, is provided with a piston 53 which has a downwardly directed cup rubber 54. Each piston 53 preferably carries a ball-spacer member 55 which is positioned in engagement with the lower plate 42. Preferably a rubber cap 56 is provided on each cylinder 50 and 51. Also preferably a spring 57 is provided below each piston to take up slack and prevent lost motion of the piston and parts connected therewith. Means hereinafter described are provided for cooperation with cylinder 143 to supply fluid, such as oil, under pressure to the lowermost end of each cylinder 50 and 51.

The cylinders 50 and 51 constitute what may be termed a cutting control or positioning means for establishing intermittent cutting relationship between the cutting tool and the material.

A plurality of springs 58 are connected with the lower plate 42 for returning said plate 42 to a lowered position after it has been raised and for holding said plate 42 in its lowermost position except when it is raised by the admission of fluid under pressure to the cylinders 50 and 51. The admission of fluid under pressure to the cylinders 50 and 51 will archingly and tensionally move the strip 18 upwardly into clamping position and clamps said strip 18 as well as applied the same to the routing tool 61.

Means hereinafter described is provided for engaging with and holding the portion of the strip 18 which is to be cut out to form a patch and this means is properly synchronized with the strip feeding means and with the strip clamping plate 42.

Figure 6:
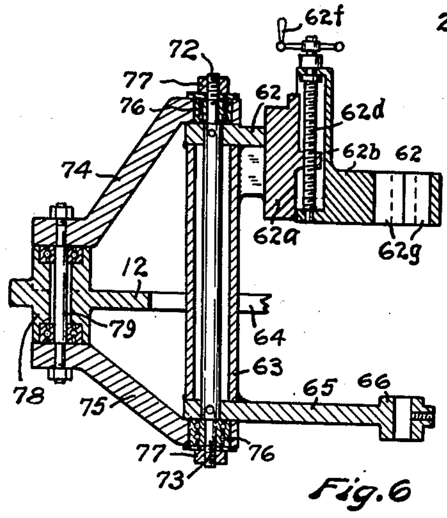
Fig. 6 is a detached sectional assembly view showing adjustable bracket arm means by which a router tool is carried and guided together with bearing means in a table supporting the same.

The routing means and controlling and operating devices therefor, see Figs. 5 and 6, comprises a router motor 60 carrying a routing tool 61 and supported by an upper swinging arm 62 of a bracket of general U-shaped form. The arm 62 carries relatively fixed part 62*a*. A vertically adjustable member 62*b* is connected by dove tail shaped gib means 62*c* with the fixed part 62*a*. A screw 62*d* is provided to move the member 62*b* up and down. A crank 62*f* is secured to the screw 62*d*. A two part bracket collar 62*g* is carried by the vertically adjustable member 62*b* and the motor 60 is held within and supported by this collar. This adjustable motor supporting means provides for a quick and easy vertical adjustment of the motor 60 and tool 61 carried thereby and is particularly useful in adjusting said motor 60 and tool 61 to patch stocks of different thickness. Preferably the motor 60 is a high speed motor as the routing tool will do smoother and more efficient work when it is operated at very high speed.

The swinging arm 62, Fig. 6, is fixedly secured to an upright tube 63 which extends downwardly through an arcuate slot 64 in the table 12. Below the table 12, the tube 63 is fixedly secured to a lower swinging arm 65 which is parallel with and extends in the same direction as the upper swinging arm 62 forming the said U-shaped bracket. The outer end portion of the lower swinging arm 65 has a hub 66, Figs. 2, 3, 5 and 6, within which an upright spindle 67 is adjustably supported. A cam roller or follower 68 is rotatively mounted on the upper end portion of the spindle 67 and is adapted to be selectively positioned in engagement with the track of either one of the cams 38, 39 or 40 as hereinafter explained. Screw means 69, Fig. 5, in the hub 66 is adapted to be positioned within selected annular notches 70 in the spindle 67 to hold the spindle in adjusted positions and a knob 71 is provided on the lower end of the spindle 67 to facilitate adjustment of said spindle.

The two swinging arms 62 and 65 and the tube 63 are rigidly secured together and operate as one integral U-shaped part. The two arms 62 and 65 are spaced a substantial distance apart. The arm 62 operates above the table 12 and the arm 65 operates below the table 12. Such positioning of the arms of the U-shaped bracket with respect to the table provides for simple construction, non-interference with feeding of material, and efficient and compact arrangement of the cam means with respect to the material on the one side and the routing tool control means on the other. The axis of the routing tool 61 and the axis of the roller 68 preferably are aligned with each other and move in similar paths for simplicity of construction and accuracy of operation.

Two axially aligned bearing members 72 and 73 extend outwardly from the end portions of the respective swinging arms 62 and 65 adjacent the locations where these arms are fixedly secured to the tube 63. Two inclined support arms 74 and 75 each have one end portion thereof pivotally mounted on the respective bearing members 72 and 73, preferably by ball or roller bearing means 76. Nuts 77 can be used to secure the support arms 74 and 75 on the bearing members 72 and 73.

The other end portions of the support arms 74 and 75 are pivotally connected with a hubbed portion 78 of the frame or table 12 as by upright bearing means 79. As the cam roller 68 follows the track surface of one of the cams 38, 39 or 40 the bearing members 72 and 73 will be moved on an arc about the axis of the bearing means 79 and the routing tool 61, which is coaxial with the roller 68, will be moved in a path similar to the path of movement of the roller 68.

The means for holding the roller 68 against the track surface of a selected one of the cams 38, 39 or 40 and for imparting movement to said roller 68 in a path determined by the shape of the cam track, see Figs. 2, 3 and 5, comprises a sliding yoke 80 having a hub portion 81, Fig. 5, provided with relatively long antifriction bearing means 89 through which the spindle 67 passes. The yoke 80 is slidably mounted preferably on two spaced apart parallel guide rods 88 and is movable on said guide rods 88 in directions transverse to the common axis of the cams 38, 39 and 40. The guide rods 88 are supported in brackets 82. The brackets 82 are rigidly secured to a gear wheel 83 and extend downwardly from said gear whel. The gear wheel 83 is rotatively mounted on the downwardly extending table portion 36 which forms the cam receptacle. Preferably ball bearing means 84 is used in mounting the gear wheel 83 on the cam receptacle 36. Thus flat retaining rings 85 are used to prevent relative longitudinal displacement of the gear wheel 83, meshes with another gear wheel 86 by which it is driven. The last mentioned gear wheel 86 is connected with an upright driven shaft 87. The shaft 87 can be continuously driven during the operation of the machine. Two tension springs 138 are provided alongside of the yoke 80 to yieldingly urge the roller 68 against the cam track 38′, 39′, or 40′, with which said roller is engaged. One end portion of each spring 138 is connected, as by pin means 139, with the gear wheel 83 and the other end portion of each spring 138 is connected, as by pin means 140, Fig. 3, with the yoke 80.

Figure 17:
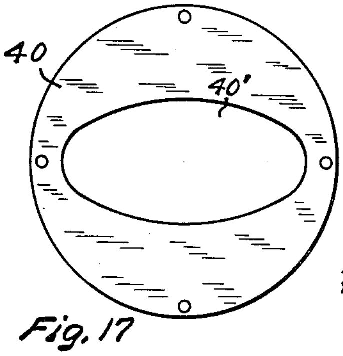
Fig. 17 is a detached plan view of a cam member embodied in the invention as representative of a plurality of cams which may be used and as well as of different types of cams.

As the guide rods 88 are carried by the gear wheel 83 and the cams 38, 39 and 40 are fixedly supported by the table 12, it is apparent that rotation of the gear wheel 83 will rotate the guide rods 88 and the yoke 80 relative to the cams. The yoke 80 carries the roller 68 and as this yoke is rotated about the axis of the gear wheel 83 the springs 138 will be rotated therewith and will yieldingly hold the roller 68 against a cam track such as cam track 40'. This will move the roller 68 in a path determined by the shape of the cam 40' and will move the tool 61 in a similar path. The cams herein illustrated, see cam 40, Figs. 7 and 17, are of oval shape and hence the tool 61 will be moved in an oval path to rout out an oval shaped patch 18' from a strip 18, see Figs. 18 and 19.

The strip 18 from which patches are to be made is intermittently advanced by the feed rolls 25, 26 and 27. As the machine is designed to make patches of different size it is desirable to provide means for adjusting the distance which a strip will be advanced each time the feed operates. This is accomplished by providing an adjustable clutch means designated generally by 90. The clutch means 90 is mounted on a shaft 91 which carries the feed roll 26. The feed rolls 25 and 27, see Fig. 3, are driven from the shaft 91 by linkbelts 92 and 93 respectively operating on suitable sprocket wheels on the shaft 91 and on the shafts of said feed rolls 25, 26 and 27.

The clutch means 90, Figs. 8 to 16, comprises a cylindrical drum 94 having a hub 95 which is rigidly secured as by a key 96 and screw 97 to the shaft 91 which carries the feed roll 26. Preferably a hardened steel ring 98 is fixedly secured within the drum 94, as by shrinking the drum 94 on said ring 98. This ring 98 provides a hardened bearing surface with which a steel roller 99 can engage to transmit intermittent rotary motion to the drum 94 and shaft 91.

The roller 99 is freely and rotatively disposed between two pins 100 which function as a cage to position said roller. The pins 100 are secured to and carried by an adjusting plate 101 which is rotatively supported on the shaft 91 external to drum 94. A yoke 102 extends across the ends of the pins 100 within the drum 94 and is rigidly secured to said pins. Another yoke 103 extends across the pins 100 adjacent to the adjusting plate 101 and is welded or otherwise rigidly secured to said pins 100. The yokes 102 and 103 cooperate with the pins 100 in forming a cage for the roller 99 and contribute to the strength and rigidity of the cage unit thus formed by the parts 100, 101, 102 and 103. The adjusting plate 101 carries another fixedly secured pin 104 which extends in an opposite direction from the pins 100 and is positioned in the path of an adjusting lever 105. A spring 104' yieldingly urges the adjusting plate 101 in a clockwise direction as respects the showing in Fig. 8 thus urging the pin 104 against the lever 105. The lever 105 is pivotally mounted on the shaft 91. The outer end portion of said lever 105 is provided with a retractable spring pressed pin 106 which is adapted to be positioned in any selected one of a plurality of holes 107 in a fixed plate 108. The plate 108 is secured to the frame 12 of the machine. Preferably the pin 106 is urged toward the plate 108 by a spring 109, Fig. 9, which is disposed in an inner tubular handle member 110 on a shank portion 111 of the pin 106 and presses against a collar 112. The outer end portion of shank 111 carries a nut 113 which engages with the outer end portion of an outer handle member 114. The outer handle member 114 is slidably movable on the inner handle member 110. Obviously an outward pull on the outer handle member 114 will withdraw the pin 106 from any hole 107 within which it is engaged and permit angular adjustment of the cage which carries the roller 99.

An oscillatory plate 115 is pivotally mounted on the shaft 91 between the drum 94 and the adjusting plate 101. An eccentric disc 116 is mounted for oscillation on the shaft 91 and secured to the plate 115 as by dowel pins 117 and a cap screw 118. A ring 119 of hardened metal is freely rotatively mounted on the eccentric disc 116. The ring 119 is adapted to be moved into engagement with the roller 99 by rotative movement of the eccentric disc 116. A flange 120 on the disc 116 helps to prevent displacement of the ring 119.

An arcuate slot 121 in the oscillatory plate 115 is provided for the pins 100 to extend therethrough.

Figure 9:
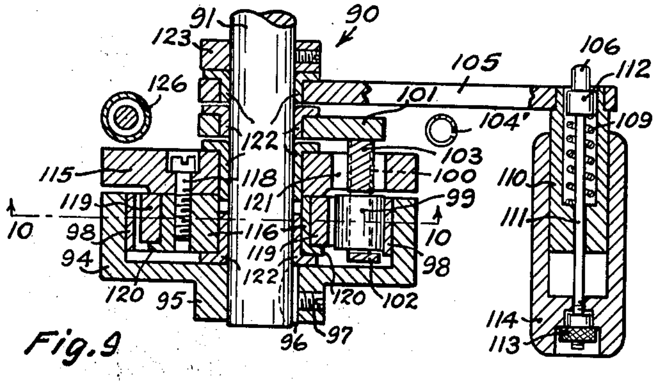
Fig. 9 is a sectional view taken substantially on broken line 9—9 of Fig. 8.
Figure 11:
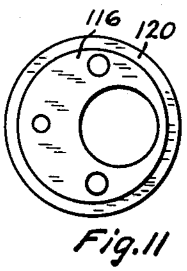
Figs. 11 and 12 are respectively a face view and an edge view of an eccentric disc embodied in this clutch-like feed control device.
Figure 12:
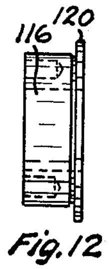
Figure 13:
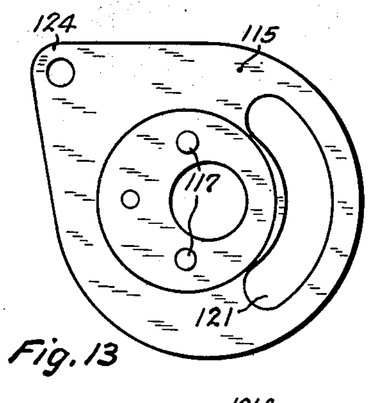
Fig. 13 and Fig. 14 are respectively a face view and an edge view of an oscillatory plate embodied in this clutch-like feed control device.
Figure 14:
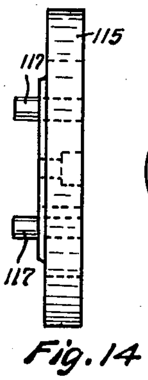
Figure 15:
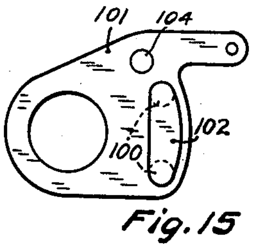
Figs. 15 and 16 are respectively a face view and an edge view of a roller adjusting cage embodied in this clutch-like feed control device.

Preferably bearing sleeves 122 are provided on the shaft 91 for each of the members 116, 115, 101 and 105 to operate on and preferably end portions of these sleeves are outwardly flanged as shown in Fig. 9 to serve as spacer means and to help prevent longitudinal displacement of the sleeves. A set collar 123 can be provided on the shaft 91 inwardly from the lever 105.

The oscillatory plate 115 preferably has a portion 124 to which a bearing pin 125 is secured. A connecting rod 126, Fig. 2, is connected with the bearing pin 125 by bearing means 127. The lower end portion of the connecting rod 126, see Fig. 2, is connected by bearing means 128 with a crank pin 129 on a disc 130. The disc 130 is secured to an intermittently driven horizontal shaft 131. Preferably means are provided for adjusting the length of the connecting rod 126 by nut means 126'. This can be done by adjustably connecting one or both of the bearing means 127 and 128 with said connecting rod 126.

The clutch shown in Figs. 8 to 16 operates in a manner similar to a ratchet to rotate the shaft 91 through a predetermined angle and thereby advance a strip 18 of patch material a predetermined amount each time one complete revolution is imparted to the shaft 131. Operation of said shaft 131 is controlled by one revolution clutch means which may be of a form diagrammatically shown in Fig. 20 and hereinafter described.

Each time one complete revolution is imparted to the disc 130 the oscillary plate 115 will be angularly moved from a starting point through a predetermined angle and back to the starting point. Assuming that the plate 115 is at its starting point when in the position shown in Figs. 2, 8, 9 and 10, one revolution of the disc 130 will first move said plate 115 counter-clockwise as respects the showing in these figures and will then move it clockwise back to its initial position. Movement of said plate 115 counter-clockwise will turn the eccentric disc 116 counter-clockwise and cause the ring 119 to engage with and jam against the roller 99 thus locking all of the parts 115, 116, 119, 99, 101 and 104 together and angularly moving them counter-clockwise to the end of the stroke. The shaft 91 is secured to the drum 94 and will be angularly moved counter-clockwise therewith. This will impart a predetermined amount of movement to the feed rolls 25, 26 and 27 and will move a strip 18 of patch making material to the left, Figs. 1, 2 and 4, a distance which has been predetermined by the setting of the adjusting lever 105. When the adjusting plate 101 is moved counter-clockwise the pin 104 thereon will be moved away from the adjusting lever 105 and the tension spring 104' will be elongated. At this point it is to be noted that the position of the adjusting lever 105 determines the starting position of the adjusting plate 101 which in turn determines the starting or initial position of the roller 99. The initial position of this roller 99 determines the point in the stroke of the oscillatory plate 115 at which the clutch will engage and begin to move the drum 94 and this determines the distance through which a strip 18 of patch making material will be advanced at each stroke, as $x—y$, Fig. 19.

Figure 8:
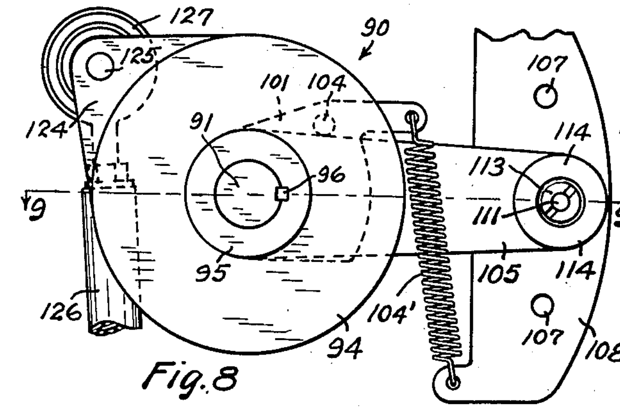
Fig. 8 is a detached elevation of an adjustable precise clutch-like feed control device for fully controlling the feed of a veneer strip to the patch making tool.
Figure 10:
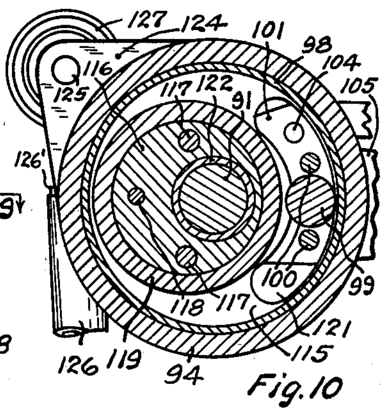
Fig. 10 is a sectional view taken substantially on broken line 10—10 of Fig. 9.

When the oscillatory plate 115 begins to move clockwise on the up stroke of the connecting rod 126, the clutch will release and the drum 94 will remain stationary while the other parts move back to their initial position. The spring 104' will move the adjusting plate 101 and roller 99 back to their initial position in which the pin 104 rests against the adjusting lever 105. The oscillatory plate 115 and eccentric disc 116 continue their movement after the roller 99 is stopped and thus have a distance of over travel which is predetermined by the setting of the adjusting lever 105. Movement of the adjusting lever 105 upwardly from the position in which it is shown in Fig. 8 will cause the clutch to engage later in its stroke and will result in less angular movement of the drum 94 on each cycle of the plate 115. Movement of the strip 18 of patch making material is proportional to movement of the drum 94 and thus the movement of the strip 18 can be adjusted to conserve material in the cutting the patches of different size.

Figure 20:
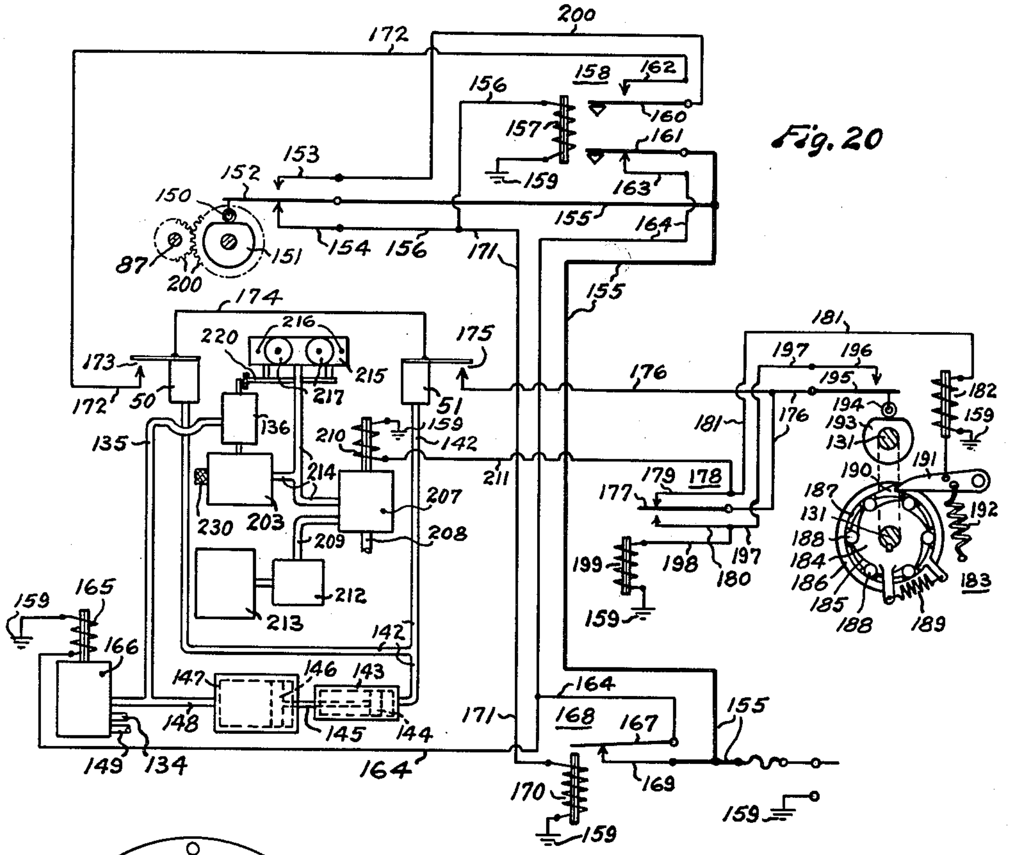
Fig. 20 is a diagram showing electrical control means for the hydraulic material positioning and patch holding means and other constituent elements of the machine.

Fig. 20 shows diagrammatically the electrical and hydraulic control means for this machine. This control means synchronizes the operation of the patch cutting means and the strip feed means and operates in connection with the two shafts 87 and 131 hereinbefore described.

Referring to the diagram, Fig. 20, a cam 151, see also Fig. 2, is synchronized with the path-movement of the patch making tool and revolves at the same speed and in the same position relationship. This can be accomplished by driving the cam 151 off of the shaft 87, by gear means 200 having the same ratio as gears 86 and 83. A cam follower 150 on this cam 151 operates a contactor 152 of a switch having two terminals 153 and 154. Electric current from source of supply conductor 153 is supplied to contactor 152. Terminal 154 is connected by conductor 156 with a solenoid 157 of a ratchet relay designated generally by 158. The circuit through the solenoid 157 can be completed through ground 159. Ratchet relay 158 has two contactors 160 and 161 arranged to be alternately moved by solenoid 157 into and out of contact with two terminals 162 and 163 respectively. The mode of operation of the ratchet relay is well known in the electrical arts and is as follows:

Solenoid 157 when intermittently energized, will move contactors 160 and 161 back and forth between two positions to alternately close and open the circuits to the terminals 162 and 163. Contactor 160 is connected by conductor 200 with terminal 153. Contactor 161 is connected with source of supply conductor 155. Terminal 163 is connected by conductor 164 with one terminal of the solenoid 165 of a three-way air control valve 166 controlling air pressure to cylinder 147 which acts on oil cylinder 143 causing cylinders 50 and 51 to be operated. The other terminal of the three-way air control valve solenoid 165 is connected with ground 159. Conductor 164 also is connected with a contactor 167 of a supervisory or holding relay 168. A terminal 169 of relay 168 is connected with source of supply conductor 155. Contactor 167 is adapted to be moved into open and closed circuit position by a solenoid 170 which has one terminal connected with ground 159 and the other terminal connected by conductors 171 and 156 with the terminal 154 of the cam operated switch.

The terminal 162 of ratchet relay 158 is connected through conductor 172, switch 173, conductor 174, switch 175, and conductor 176 with a contactor 177 of a strip feed relay 178. Strip feed relay 178 has two terminals 179 and 180. The terminal 179 is connected by conductor 181 with one terminal of a clutch release solenoid 182, the other terminal of solenoid 182 is connected with ground 159. The clutch release solenoid 182 controls the release of a single revolution clutch of standard construction indicated generally by 183 and this clutch 183 controls the operation of the strip feed driving shaft 131 and allows said shaft 131 to make one complete revolution each time said single revolution clutch 183 is released by the energizing of solenoid 182. One revolution clutches of this type are well known mechanical devices. As illustrative of a one revolution clutch which will accomplish this purpose, Fig. 20 shows diagrammatically an inner clutch member 184 having peripheral cam surfaces 185 and fixedly secured to the shaft 131. An outer constantly driven cylindrical member 186, driven as by belt 186A, Fig. 2, rotates around the inner member 184. A cylindrical roller cage 187 is disposed betwen the two members 184 and 186, rollers 88 are supported by the cage 187 and operatively disposed between the members 184 and 186. A tension spring 189 is connected between the roller case 187 and the inner clutch member 184 to relatively move these two parts 187 and 184 and thus move the rollers 188 into locking engagement between the outer clutch member 186 and the cam surfaces 185 of the inner clutch member 184. A lug 190 on the roller cage 187 is adapted to be engaged by a pawl 191 which is connected with the solenoid 182 and is adapted to be retracted by the energizing of this solenoid 182. A spring 192 yieldingly positions the pawl 191 in the path of movement of the lug 190 when the solenoid 182 is not energized. When the cage 187 is released by lifting of the pawl 191 the spring 192 will instantly move the rollers 188 into locking position and said cage 187 together with the member 184 and shaft 131 will be locked to and rotate with the outer clutch member 186. Upon completion of one revolution of the parts 131, 184, 187 and 188 the shoulder 190 will contact the pawl 191, which has been returned to its initial holding position due to the de-energizing of solenoid 182, and the rollers 188 will be retracted allowing the constantly driven member 186 to continue to rotate while parts 131, 184, 187 and 188 are restrained from rotation until the pawl 191 is again released by the energizing of solenoid 182.

The de-energizing of solenoid 182 is controlled by a cam 193 on shaft 131. A follower 194 on cam 193 is arranged to move a contactor 195 into contact with a terminal 196. The contactor 194 is connected with the conductor 176. The terminal 196 is connected by conductor 197 with the terminal 180 of strip feed relay 178. Terminal 180 is connected by a conductor 198 with a solenoid 199 through which a circuit can be completed to ground 159.

Fluid, such as oil, under pressure is supplied to the hydraulic cylinders 50 and 51 through conduits 142 which communicate with a hydraulic actuating cylinder 143. A piston 144 in the cylinder 143 is connected with a piston 146 in an air cylinder 147. An air conduit 148 connects the air cylinder 147 with the three-way air control valve 166 of standard construction. When the solenoid 165 is energized the valve 166 will be actuated either by gravity or electrically or by spring means, depending upon the particular type of standard valve employed, to permit the passage of air under pressure therethrough from a compressed air inlet pipe 149 to the air conduit 148. When said solenoid 165 is de-energized the valve 166 will be returned to a starting position in which the inlet of compressed air from pipe 149 is cut off and the air conduit 148 is communicatively connected with an exhaust conduit 134.

The three-way air control valve 166 is also connected by way of the conduit 148 and by way of a branch conduit 135, see also Fig. 5, with an air cylinder 136. A piston 137 in the air cylinder 136 is connected by a piston rod 201 with another piston 202 in the housing 203 of a vacuum control valve. A spring 204 urges the piston 137 in one direction and the admission of compressed air through conduit 135 is adapted to move the piston 137, together with the piston 202, in the opposite direction. The spring 204 is disposed within a housing 205 which preferably is air tight except that a small orifice 206 of such degree of smallness is provided, whereby on the down stroke of the piston 137 a cushioning pressure is afforded. Spring 204 may be only of such strength as to return piston 137 and parts 201 and 202 to raised position. A second three-way air control valve 207 connected with a compressed air supply conduit 208 and a vacuum conduit 209 is adapted to be operated by a solenoid 210. The solenoid 210 has one terminal connected with the ground 159 and the other terminal connected by a conductor 211 with the terminal 179 of the strip feed relay 178. The vacuum conduit 209 is connected with a vacuum pump 212 which may be driven by a motor 213. Tubular conduit means 214 connects the three-way valve 207 with the vacuum cylinder housing 203 and said conduit means 214 also connects the three-way valve 207 with patch holding devices now to be described.

The means for holding a patch 18' while the same is being routed or cut out of the patch forming material 18, see Figs. 1, 5, 5A and 20, comprises a movable patch holding member 215 positioned directly under the oval shaped openings 43 and 44 in the plates 41 and 42 so that it will extend lengthwise of the patch. For the best results the patch holding member 215 is provided with upwardly protruding spaced apart patch holding and wood penetrating needles 216 which are adapted to sink into the patch and help hold said patch steady while it is being routed. Preferably at least two needles are provided. These needles 216 are of small diameter and have sharp points and do not mar the patch. The function of these needles, as above described, is most important in providing a smooth edged and accurately cut patch. The patch holding member 215 is further provided with upwardly directed vacuum cup or cups 217 of rubber or like air tight elastic material through which cups a controlled vacuum force may be exerted.

The vacuum cups 217 are positioned within recesses 215' in the patch holding member 215 and extend a slight distance above the upper surface of the patch holding member 215 so that both the vacuum cups 217 and the patch holding member contact the patch. The top of the patch holding member 215 provides a firm base in a given plane against which the patch 18' may be held by the suction exerted through the cups 217 and this combined arrangement also provides a support for the entire edge portion of the patch while it is being cut.

Figure 5A:
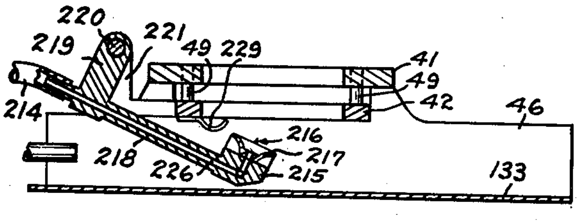
Fig. 5A is a detached fragmentary view partly in section and partly in elevation showing patch holding means in a patch releasing position which it may occupy at the time a patch is being dropped and discharged from the machine.
Figure 5B:
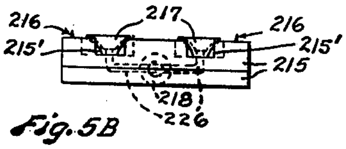
Fig. 5B is a detached front edge view of a patch holding member embodied in this invention showing vacuum cups and needles thereon.

The patch holding member 215 is rigid with a tubular lever arm 218 by which it is supported. The lever arm 218 has an upwardly extending fixedly secured support arm 219. The upper end portion of the support arm 219 is fixedly secured to a shaft 220. The shaft 220 is pivotally supported in preferably three brackets 221 which are rigid with the lower clamping plate 42. A torsion spring 222 on the shaft 220 exerts a resilient force which tends to hold the lever arm 218 and patch holding member 215 in a lowered position as shown in Fig. 5A.

A lever arm 223, rigid with the shaft 220, is connected as by a tension spring 224 and piston rod 225, with the piston 202, and thereby to piston 137. The tension spring 224 compensates for variations in the thickness of the veneer stock 18. The mechanism just described provides means for moving the vacuum cups 217 and needles 216 upwardly into contact with the patch section 18*a* of the veneer strip 18, as shown in Fig. 5, whenever air under pressure is admitted through conduit 135 to the cylinder 136.

The tubular lever arm 218 and patch holding member 215 have passageways 226 which communicate with both of the vacuum cups 217 and are communicatively connected with the conduit 214 which connects with the three-way valve 207.

The port 227 through which the conduit 214 connects with the vacuum valve cylinder 203 is located so that when the piston 202 is in the lowered position, as shown in Fig. 5, this port 227 will be covered by said piston. Also another port 228 which has communication with the atmosphere through a screen 230 is positioned in the same transverse plane of cylinder 203 as is port 227 and is covered by piston 202 whenever port 227 is so covered. When the piston 202 is in a raised position both of the ports 227 and 228 will be uncovered and the conduit 214 will be open to the atmosphere. When ports 227 and 228 are covered by piston 202, then vacuum is exerted in conduit 214 thereby exerting vacuum through cups 217 on the patch section 18*a*.

The operation of the control means shown diagrammatically in Fig. 20 is as follows: The cam 151 and the external member 186 of the single revolution clutch which is connected with the shaft 131 are each continuously driven. Each time the follower 150 passes from the arcuate portion onto the flat portion of the cam 151, a circuit will be closed from conductor 155 through contactor 152, terminal 154, conductor 156, and solenoid 157 to ground 159. This energizing of solenoid 157 will operate ratchet relay 158 and change the position of contactors 160 and 161. It will be assumed that solenoid 157 is energized and has just moved contactors 160 and 161 to break a previously closed contact with terminal 162 and close a previously broken contact with terminal 163. This completes a circuit from conductor 155, through contactor 161, terminal 163, conductor 164 and the solenoid 165 of three-way air control valve 166 to ground 159. The completion of this circuit moves air control valve 166 and supplies air pressure to cylinder 147 which moves pistons 146 and 144 and delivers fluid such as oil under pressure to the cylinders 50 and 51. This causes the pistons in cylinders 50 and 51 to move the strip of material 18 into engagement with the continuously moving driven tool 61 and clamp this arched strip 18 under tension against the upper plate 41 where it is securely held while a patch is being cut. Also at the same time the movement of valve 166 allows air under pressure to flow through conduit 135 into cylinder 136, see also Fig. 5, and this moves the vacuum cups 217 and needles 216 into operative engagement with the patch which the tool is starting to cut. It will be noted that when piston 202 is moved downwardly by the admission of compressed air to cylinder 136, it closes port 227 so that vacuum exerted by the continuously operating pump 212 will be exerted through the then open three-way air valve 207 and conduits 214 and 226 on the vacuum cups 217 to cause these cups to securely grip and hold the patch which is being cut. Incidentally the closing of the circuit through terminal 154 of the cam operated switch also completes a circuit from conductor 155, through contactor 152, terminal 154, conductor 171 and solenoid 170 of the supervisory relay 168 to ground 159. The energizing of solenoid 170 closes a circuit through the supervisory relay 168 from conductor 155, through terminal 169, contactor 167 and conductor 164 to the solenoid 165 of the three-way air control valve 166. The closing of these circuits to and through the supervisory relay 168 at this time in the cycle is immaterial but these circuits do perform a useful function each alternate time they are closed as hereinafter described.

The flat portion of the cam 151 preferably maintains a closed circuit through terminal 154 while the cam is moving through an angle of about fifteen degrees. At the end of this approximately fifteen degree travel of the cam 151, the follower 150 is moved outwardly and both of the previously described circuits to solenoids 157 and 170 are broken. Incidentally the contactor 152 is caused to contact the terminal 153 at this time but this contact is immaterial at this time in the cycle because the contactor 160 is in an open circuit position. The positions of the contactors of ratchet relay 158 are not changed by the de-energizing of solenoid 157 and the circuit through ratchet relay 158 to the air valve solenoid 165 is maintained closed until the cam 151 has made one complete revolution and is back to a position where the follower 150 drops onto the flat surface of said cam. The cam 151 and the routing tool 61 revolve at the same rate of speed and in the same position relationship and while the cam has been moving one complete revolution from the assumed starting point the routing tool 61 will have completed an oval cut in the strip 18.

At this assumed starting point the follower 150 will again pass onto the flat surface of the cam 151 and the circuits to the ratchet relay solenoid 157 and the supervisory relay solenoid 170 will both again be closed. This simultaneously closes a previously described circuit through the supervisory relay 168 to the air valve solenoid 165 and breaks a previously described circuit through the ratchet relay 158 to the air valve solenoid 165. Also it closes a circuit from conductor 155 through contactor 152, terminal 153, conductor 200, contactor 160, terminal 162 and conductor 172 as far as then open safety switch 173. The closed circuit established through supervisory relay 168, as just described, will hold the air valve 166 open and keep the strip 18 of veneer stock clamped against the upper plate 61 while the cam 151 continues to move through a further angle of about fifteen degrees and the follower 150 remains on the flat portion of said cam. This provides for about fifteen degrees overlap of the routing tool 61 while the work is clamped and held in its path. It has been found that this overlap in the travel of the routing tool 61 is desirable to insure that the patch will be completely severed from the stock and will have time to drop down on the plate 133 before the stock is lowered and advanced.

When the follower 150 again pases onto the raised portion of the cam 151 the circuit through the supervisory relay 168 to the air valve solenoid 165 will be broken thus de-energizing solenoid 165. At the same time circuits to the three-way air valve 207 and the strip feed means will be closed as follows: Movement of the contactor 152 will break contact with terminal 154, in the circuit of supervisory relay 168, and make contact with terminal 153. The breaking of the circuit to the supervisory relay 168 and de-energizing of solenoid 165 will allow the air valve 166 to change its position and this will exhaust the cylinders 50 and 51 and close the switches 173 and 175.

The closing of switches 173 and 175 by the lowering of plate 42 completes a circuit from energized conductor 172 by way of switch 173, conductor 174, switch 175, conductor 176, contactor 177, terminal 179 and conductor 211 to solenoid 210 of three-way air control valve 207. The momentary energizing of solenoid 210 moves valve 207 to cut off vacuum to conduit 214 and at the same time to admit compressed air from pipe 208 to said conduit 214. This blows a jet of compressed air through conduit 214 to the vacuum cups 217 thereby blowing out occluded saw dust within the conduits. This is very important in maintaining the machine in continued operations. The hook 229 breaks the patch lose from the cup 217 when the arm 218 drops downwardly, and if by any reason the patch is not removed from the cup 217, said jet of compressed air releases the patch.

As the piston 202 is raised at this time, the jet of compressed air is free to discharge from conduit 214 through ports 227 and 228 and helps to maintain screen 230 clear for the passage of air. The solenoid 210 is only energized momentarily and is quickly de-energized by the movement of contactor 177, as hereinafter described.

When a patch 18′ is thus dropped one edge portion of said patch will be supported on clips 229, see Figs. 1 and 5A, which are carried by the lower clamping plate 42. The clips 229 help to disengage the patch from the vacuum cups 217 and needles 216 and tend to support the patch in an inclined position. One preferred way to insure discharge of the patches from the machine is to tilt or incline the entire machine in a clockwise direction as respects the showing in Figs. 5 and 5A sufficiently so that the patches when released, and also the cuttings from the tool 61 will discharge by gravity. Another satisfactory way to discharge the patches from the machine is to blow or draw either an intermittent or a constant blast of air across the plate member 133 from left to right as respects the showing in Figs. 5 and 5A to remove both the patches and the cuttings from the tool 61.

The closing of switches 173 and 175 also completes a circuit from conductor 155 through contactor 152, terminal 153, conductor 200, contactor 160, terminal 162, conductor 172, switch 173, conductor 174, switch 175, conductor 176, strip feed relay contactor 177, terminal 179, conductor 181 and clutch release solenoid 182 to ground 159. Also at the same time, it completes a circuit to the contactor 195, which is arranged to be moved between an open and a closed position by the follower 194 of cam 193 on strip feed drive shaft 131. The contactor 177 of strip feed relay 178 is normally closed as respects terminal 179 and open as respects terminal 180 but can be opened as respects terminal 179 and closed as respects terminal 180 by the energizing of solenoid 199.

The energizing of the clutch release solenoid 182 releases the pawl 191 and starts the operation of the one revolution clutch 183 to impart one revolution to the shaft 131 and thereby feed the strip 18 of veneer forward a sufficient distance to provide material for the next patch. Shortly after shaft 131 begins to turn the cam 193 closes the circuit through contactor 195, terminal 196, conductor 197, conductor 198, and solenoid 199 to ground 159. This moves contactor 177, breaks the circuit through terminal 179 to clutch release solenoid 182 and closes a holding circuit through terminal 180 and conductor 198 to solenoid 199. This keeps the circuit to the clutch release solenoid 182 de-energized so that the clutch 183 can complete one revolution and be stopped and held by the pawl 191 with the follower 194 on the flat portion of the cam 193 and contactor 195 in open switch position, as respects terminal 196.

The above described operation of the one revolution clutch 183 takes place while the cam 151 is moving through less than one complete revolution and the follower 150 is on the raised portion of said cam. As soon as the follower 150 again passes onto the flat portion of the cam 151 the circuit through terminal 162 of ratchet relay 158 will be broken, the solenoid 199 of strip feed relay 178 will be de-energized and another cycle will be started.

Figure 16:
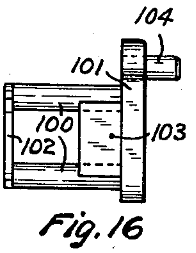
Figure 16A:
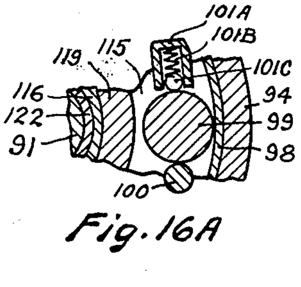
Fig. 16A is a detached fragmentary sectional view of a modified form of roller and roller cage means which may be used in said clutch-like feed control device characterized in providing extremely high degree of accuracy.

In the modified form, as shown in Fig. 16A, of the rotatable or roller means of the clutch member shown in Figs. 8 to 16 inclusive, one of the fixed pin members 100 is replaced by a member 100A having a spring 100B yieldingly urging a bearing member 100C against the rotatable member 99. This construction eliminates all lost motion of the rotatable member 99 and provides for extreme accuracy as to time or cycle of the gripping of the clutch controlling the feeding mechanism—such rotatable member may be a roller or a ball.

The operation of this machine has been set forth hereinabove in connection with the description of its parts and construction. The mode of operation may be summarized as follows: Strips 18 from which patches 18′ are to be made are placed on the supporting rolls 17 with their forward ends against the stop member 20 and with the weight 21 resting on these strips and the forward end portion of the lowermost strip resting on the feed roll 27. Power is supplied to continuously drive the router motor 60 and the shaft 87 and the member 186 which operates through the one revolution clutch to intermittently drive the shaft 131. The shaft 87 drives the gear wheels 86 and 83 and this operates the bracket means shown in Fig. 6 and the parts carried thereby to move the routing tool 61 in a path which corresponds to the path of movement of the axis of the cam roller 68. The electrical devices shown in Fig. 20 operates in synchronized relation to the patch making means and properly synchronize the operation of the several parts of the machine.

The strip feed means and the hydraulic means for lifting and clamping the strip 18 and holding the patch while a patch is being made operate alternately. The routing tool 61 makes a patch in the course of one revolution and then idles during the next revolution while the strip 18 is being advanced.

The strips 18 feed successively one after another as long as there are any strips on the pile.

Obviously changes may be made in the forms, dimensions, and arrangement of parts of this invention, without departing from the principle thereof, the above setting forth only preferred forms of embodiment.

I claim:

1. In a machine of the class described, a frame; a patch veneer stock holding means mounted on said frame; a routing tool means mounted on said frame on one side of said stock holding means; a movable patch section holding vacuum cup carrying arm pivotally mounted adjacent said patch stock holding means; a vacuum cup mounted on said vacuum cup arm; a vacuum developing means communicatingly connected to said cup; and wood piercing means adjacent said cup which penetrates the veneer patch section.

2. In a machine of the class described, a frame; a patch veneer stock clamping means mounted on said frame having an opening extending through said means of substantially larger size than the patch to be cut from said stock; an automatically mechanically actuated and guided routing tool swingingly mounted on said frame on one side of said stock clamping means; an automatically separate movable patch section holding arm pivotally mounted adjacent said patch stock clamping means out of the path of said routing tool, having a vacuum cup opening; a vacuum cup mounted in said opening engageable continuously with said stock while said routing tool is caused to progressively advance in the cutting path of the patch pattern while said clamping means is holding the stock on the outside of the cutting path, whereby said patch section may be firmly held by the simultaneously cooperative action of the clamping means and the suction cup while being formed into a cut-out patch; and an actuating means for said arm whereby said arm may be moved into engagement with one surface of the patch veneer stock.

3. In a machine of the class described, a frame; a patch veneer stock holding means mounted on said frame; an automatically mechanically actuated and guided routing tool means mounted on said frame on one side of said stock holding means; an automatically movable patch section holding arm mounted adjacent said patch stock holding means, having a bar with vacuum cup opening and wood piercing means carried by said bar which penetrates the veneer stock; vacuum cup mounted in said cup opening, whereby said patch section may be firmly held while being formed into a cut out patch; and actuating means for said arm whereby said bar may be moved into engagement with one surface of patch veneer stock.

4. In a machine of the class described, a frame; a patch veneer stock holding means mounted on said frame; an automatically mechanically actuated and guided routing tool means mounted on said frame on one side of said stock holding means; an automatically movable patch section holding arm mounted adjacent said patch stock holding means having a bar with a vacuum cup opening in each end portion and wood piercing means adjacent each of said cup openings; a vacuum cup mounted in each cup opening whereby said patch section may be firmly held while being formed into a cut out patch; and actuating means for said arm whereby said bar may be moved into engagement with one surface of patch veneer stock.

5. In a machine of the class described, a frame; a patch veneer stock clamping plates having registering openings therein and guiding pins mounted on said frame; an automatically mechanically actuated and guided routing tool means mounted on said frame on one side of said stock holding means; an automatically movable patch section holding vacuum cup carrying arm pivotally mounted adjacent to and movable in an arc with respect to said patch stock clamping plates; a vacuum cup mounted on said vacuum cup arm; a vacuum developing means communicatingly connected to said cup; air pressure supply means; vacuum control means connected to said vacuum developing means and to said air pressure supply means, whereby when said vacuum to said cup is relieved, a blast of air under pressure is immediately and momentarily supplied to said cup thereby blowing out the air lines and cooperating in dislocating the patch.

6. In a machine of the class described, a frame; a patch veneer stock holding means mounted on said frame at a substantial angle to the horizontal; an automatically mechanically actuated and guided routing tool means mounted on said frame on one side of said stock holding means; cam guiding means for said routing tool; and an automatically movable patch section holding vacuum cup mounted adjacent said patch stock holding means, whereby said patch section may be firmly held while being formed into a cut out patch and the discharge of which patch is facilitated by gravity due to the angular tilt of said stock holding means.

7. In a machine of the class described, patch forming material holding means which clamps the patch forming material outwardly from the area from which a patch is to be cut; an automatically mechanically actuated and guided patch cutting tool movable in the patch forming material in an overlapping circuit; a cam guiding means for said cutting tool; and other and separate tension mounted holding means which is engageable with that portion of the patch forming material which is to be cut out as a patch and which holding means is supported by means located out of the path of said routing tool, whereby the patch forming material is firmly held at all times on both sides of the line of cutting and whereby the cutting tool is movable in the patch forming material in a continuous operation in an endless path around said last-mentioned holding means in providing a match characterized by having a smooth edge surface.

8. In a machine for cutting patches out of a patch forming material adjacently mounted holding plates movable toward and away from each other, said plates having registering openings across which the patch forming material extends, whereby patch forming material may be selectively clamped and released; an automatically mechanically actuated and guided cutting tool supported for movement in a predetermined endless path in the patch forming material; and a swingingly mounted patch holding member selectively engageable with that portion of the patch forming material around which the tool moves, whereby the patches are supported on each side of the endless path during the cutting operation.

9. In a machine for cutting patches out of patch forming material, two parallel clamping plates movable toward and away from each other to selectively clamp and release patch forming material, said plates having registering openings across which patch forming material clamped by said plates extends; a driven tool having a patch cutting element movable in an endless path within the patch forming material which extends across said openings; a movable patch holding member; vacuum cups carried by said patch holding member positioned to engage the side of the patch forming material opposite from said tool and within the area around which the cutting element of the tool moves; a vacuum exerting means communicatively connected with said vacuum cups; and protruding needle members carried by said patch holding member and positioned adjacent said vacuum cups, whereby said vacuum cups and said needle members cooperate to hold a patch while the same is being cut.

10. In a routing machine, a patch pattern determining cam; a driven routing tool; material supporting means positioned between said driven routing tool and said cam; a clamping plate positioned adjacent to and in spaced relation from said material supporting means on the side thereof toward the driven routing tool; material feeding means operable, whereby material is fed between said material supporting means and said clamping plate; supporting means moving devices connected with said material supporting means, whereby the supporting means can be moved toward the routing tool to clamp material against the clamping plate and apply said material to the routing tool; a patch holding member swingingly movable toward and away from material held by said material supporting means at the side of the material opposite said routing tool; vacuum cups carried by said patch holding member and positioned to engage said material; protruding needles carried by said patch holding member adjacent said vacuum cups arranged to be pressed into the material by the pull of the cups; and vacuum exerting means communicatively connected with the cups.

11. In a machine of the class described, a frame; a stock holding means mounted on said frame; an automatically mechanically actuated routing tool means mounted on said frame above said holding means; a cam guiding means for said routing tool; a vacuum cup holding arm pivotally mounted adjacent said stock holding means out of the path of said routing tool; a vacuum developing means; and vacuum cup mounted on said vacuum cup holding arm which cup is communicatively connected to said vacuum developing means.

12. In a machine for cutting patches out of patch forming material an upper fixed and a lower movable clamping plate having registering openings across which the patch forming material extends; an automatically mechanically actuated and guided cutting tool supported for movement in a predetermined endless path in the patch forming material which extends across said openings; and a swingingly mounted patch holding member selectively engageable with that portion of the patch forming material around which the tool moves, the top of said member in applied position being on a level a little higher than the plane of the top surface of the lower clamping plate in clamping position, whereby the patch portion is placed under tension during the cutting operation.

13. In a machine of the class described, a frame; a stock holding means mounted on said frame; feeding means whereby stock may be fed to said holding means; an automatically mechanically actuated and guided routing tool mounted on said frame above said holding means; and a resiliently held patch holding arm movably mounted adjacent said stock holding means having patch engaging means, whereby said patch portion may be held while being cut from said stock.

CHARLES A. SHERMAN.

References Cited in the file of this patent

UNITED STATES PATENTS

| Number | Name | Date |
|---|---|---|
| 1,497,765 | Abbot | June 17, 1924 |
| 1,569,490 | Hiscock | Jan. 12, 1926 |
| 2,366,728 | Handley | Jan. 9, 1945 |